United States Patent
Wang et al.

(10) Patent No.: US 11,224,081 B2
(45) Date of Patent: Jan. 11, 2022

(54) DISENGAGED-MODE ACTIVE COORDINATION SET MANAGEMENT

(71) Applicant: Google LLC, Mountain View, CA (US)

(72) Inventors: Jibing Wang, Saratoga, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 22 days.

(21) Appl. No.: 16/210,969

(22) Filed: Dec. 5, 2018

(65) Prior Publication Data

US 2020/0187281 A1    Jun. 11, 2020

(51) Int. Cl.
| | |
|---|---|
| *H04W 4/00* | (2018.01) |
| *H04W 76/15* | (2018.01) |
| *H04L 5/00* | (2006.01) |
| *H04W 40/00* | (2009.01) |
| *H04W 48/14* | (2009.01) |
| *H04W 48/20* | (2009.01) |
| *H04W 72/08* | (2009.01) |
| *H04W 72/12* | (2009.01) |

(52) U.S. Cl.
CPC ........... *H04W 76/15* (2018.02); *H04L 5/0051* (2013.01); *H04W 40/005* (2013.01); *H04W 48/14* (2013.01); *H04W 48/20* (2013.01); *H04W 72/085* (2013.01); *H04W 72/1231* (2013.01)

(58) Field of Classification Search
None
See application file for complete search history.

(56) References Cited

U.S. PATENT DOCUMENTS

| | | | |
|---|---|---|---|
| 6,038,448 | A  | 3/2000  | Chheda et al. |
| 8,023,463 | B2 | 9/2011  | Dick et al. |
| 8,315,629 | B2 | 11/2012 | Pamp et al. |
| 8,483,184 | B2 | 7/2013  | Yokoyama et al. |
| 8,665,806 | B2 | 3/2014  | Wang et al. |

(Continued)

FOREIGN PATENT DOCUMENTS

| | | |
|---|---|---|
| CN | 102474743 | 5/2012 |
| CN | 104067660 | 9/2014 |

(Continued)

OTHER PUBLICATIONS

"International Search Report and Written Opinion", PCT Application No. PCT/US2019/063240, dated Feb. 13, 2020, 16 pages.

(Continued)

*Primary Examiner* — Zewdu A Beyen
(74) *Attorney, Agent, or Firm* — Colby Nipper PLLC

(57) ABSTRACT

This document describes methods, devices, systems, and means for disengaged-mode active coordination set (ACS) management. A user equipment (110) uses an ACS for joint wireless communication between the user equipment (110) and multiple base stations (120) included in the ACS. The user equipment (110) receives a resource configuration for an ACS Disengaged-mode Reference Signal (ADRS). The user equipment (110) transitions to a disengaged mode (424) and receives the ADRS. The user equipment (110) determines that an updated ACS is required, transmits a message or a sounding signal indicating the need for the updated ACS, and in response, receives the updated ACS from a master base station (121).

22 Claims, 9 Drawing Sheets

(56) References Cited

U.S. PATENT DOCUMENTS

| | | | |
|---|---|---|---|
| 8,706,156 | B2 | 4/2014 | Han et al. |
| 9,008,678 | B2 | 4/2015 | Schoenerstedt |
| 9,100,095 | B2 | 8/2015 | Mantri |
| 9,374,772 | B2 * | 6/2016 | Daoud .................. H04W 48/16 |
| 9,380,533 | B2 | 6/2016 | Chung et al. |
| 9,674,863 | B2 | 6/2017 | Cheng et al. |
| 9,743,329 | B2 | 8/2017 | Xiao et al. |
| 10,834,645 | B2 | 11/2020 | Wang et al. |
| 2003/0002460 | A1 | 1/2003 | English |
| 2006/0013185 | A1 * | 1/2006 | Seo ....................... H04W 36/30 |
| | | | 370/343 |
| 2006/0116156 | A1 | 6/2006 | Haseba et al. |
| 2006/0128312 | A1 | 6/2006 | Declerck et al. |
| 2006/0203731 | A1 | 9/2006 | Tiedemann et al. |
| 2010/0142462 | A1 | 6/2010 | Wang et al. |
| 2010/0173660 | A1 | 7/2010 | Liu et al. |
| 2010/0210246 | A1 | 8/2010 | Yang et al. |
| 2011/0080893 | A1 | 4/2011 | Fong et al. |
| 2011/0096751 | A1 | 4/2011 | Ma et al. |
| 2011/0281585 | A1 | 11/2011 | Kwon et al. |
| 2012/0087273 | A1 | 4/2012 | Koo et al. |
| 2012/0120821 | A1 | 5/2012 | Kazmi et al. |
| 2012/0178462 | A1 * | 7/2012 | Kim .................... H04W 72/048 |
| | | | 455/450 |
| 2012/0218968 | A1 | 8/2012 | Kim et al. |
| 2013/0053045 | A1 * | 2/2013 | Chuang ................. H04W 48/20 |
| | | | 455/440 |
| 2013/0053079 | A1 | 2/2013 | Kwun et al. |
| 2013/0089058 | A1 | 4/2013 | Yang et al. |
| 2013/0242787 | A1 | 9/2013 | Sun et al. |
| 2013/0244682 | A1 | 9/2013 | Schoenerstedt |
| 2014/0112184 | A1 | 4/2014 | Chai |
| 2014/0169201 | A1 * | 6/2014 | Tamura ................. H04L 5/0037 |
| | | | 370/252 |
| 2014/0287759 | A1 * | 9/2014 | Purohit ............. H04W 36/0085 |
| | | | 455/437 |
| 2014/0348104 | A1 | 11/2014 | Morita |
| 2014/0376478 | A1 | 12/2014 | Morita |
| 2015/0244489 | A1 | 8/2015 | Wang |
| 2015/0326282 | A1 | 11/2015 | Futaki |
| 2016/0028448 | A1 | 1/2016 | Park et al. |
| 2016/0037511 | A1 | 2/2016 | Vincze et al. |
| 2017/0105147 | A1 | 4/2017 | Jiang et al. |
| 2017/0164252 | A1 | 6/2017 | Chaudhuri et al. |
| 2017/0250786 | A1 * | 8/2017 | Better ................... H04L 5/0073 |
| 2018/0152951 | A1 | 5/2018 | Zhuang et al. |
| 2018/0213450 | A1 | 7/2018 | Futaki et al. |
| 2018/0220403 | A1 | 8/2018 | Wilson et al. |
| 2019/0028348 | A1 | 1/2019 | Chai |
| 2019/0053235 | A1 * | 2/2019 | Novlan ................... H04L 5/001 |
| 2019/0082331 | A1 | 3/2019 | Raghavan et al. |
| 2019/0165843 | A1 | 5/2019 | Wu et al. |
| 2019/0253106 | A1 | 8/2019 | Raghavan et al. |
| 2020/0178131 | A1 | 6/2020 | Wang et al. |

FOREIGN PATENT DOCUMENTS

| | | |
|---|---|---|
| CN | 107736048 | 2/2018 |
| CN | 107872889 | 4/2018 |
| EP | 2809104 | 12/2014 |
| WO | 2012114151 | 8/2012 |
| WO | 2016191091 | 12/2016 |
| WO | 2017117340 | 7/2017 |
| WO | 2018073485 | 4/2018 |
| WO | 2019038700 | 2/2019 |
| WO | 2018025789 | 5/2019 |
| WO | 2020112680 | 6/2020 |
| WO | 2020142532 | 7/2020 |
| WO | 2020159773 | 8/2020 |
| WO | 2021054963 | 3/2021 |

OTHER PUBLICATIONS

"International Search Report and Written Opinion", PCT Application No. PCT/US2019/063081, dated Feb. 21, 2020, 14 pages.
"International Search Report and Written Opinion", PCT Application No. PCT/US2019/069129, dated Mar. 31, 2020, 13 pages.
"LTE; Evolved Universal Terrestrial Radio Access (E-UTRA) and Evolved Universal Terrestrial Radio Access Network (E-UTRAN); Overall Description; Stage 2 (3GPP TS 36.300 version 15.3.0 Release 15)", ETSI TS 136 300 V15.3.0 (Oct. 2018), Oct. 2018, 366 pages.
"Non-Final Office Action", U.S. Appl. No. 16/206,579, dated Apr. 1, 2020, 23 Pages.
"Universal Mobile Telecommunications System (UMTS); Automatic Neighbour Relation (ANR) for UTRAN", 3GPP TS 25.484 version 10.0.1 Release 10, Jan. 2012, 21 pages.
Zhang, et al., "PoC of SCMA-Based Uplink Grant-Free Transmission in UCNC for 5G", IEEE Journal on Selected Areas in Communications, vol. 35, No. 6, Jun. 2017, 10 pages.
"Universal Mobile Telecommunications System (UMTS); Automatic Neighbour Relation (ANR) for UTRAN", 3GPP TS 25.484 version 11.0.0 Release 11, Jan. 2012, 22 pages.
Gorcin, et al., "Hybrid Automatic Neighbor Relations for 5G Wireless Networks", 2017, 6 pages.
"International Preliminary Report on Patentability", Application No. PCT/US2019/051980, dated Dec. 8, 2020, 7 pages.
"Supplemental Notice of Allowance", U.S. Appl. No. 16/206,579, dated Sep. 30, 2020, 3 pages.
"Written Opinion", Application No. PCT/US2019/063240, dated Oct. 27, 2020, 10 pages.
"Written Opinion", Application No. PCT/US2020/014638, dated Nov. 26, 2020, 5 pages.
"5G; Study on New Radio (NR) Access Technology", ETSI TR 138 912; V14.0.0; Technical Report; 3GPP TR 38.912 version 14.0.0 Release 14, May 2017, 77 pages.
"Beam Management and Beam Reporting", 3GPP TSG RAN WG1 Meeting #88bis, R1-1704488, Spokane, Washington, USA Apr. 3-7, 2017, Apr. 2017, 7 pages.
"Discussion on HARQ Management and HARQ-ACK Feedback", 3GPP TSG RAN WG1 Meeting #91, R1-1720203, Reno, USA, Nov. 27-Dec. 1, 2017, Dec. 2017, 5 pages.
"International Search Report and Written Opiniion", Application No. PCT/US2019/051980, dated Jul. 27, 2020, 19 pages.
"International Search Report and Written Opinion", PCT Application No. PCT/US2020/014638, dated May 13, 2020, 12 pages.
"Invitation to Pay Additional Fees", PCT Application No. PCT/US2019/051980, dated Jun. 4, 2020, 10 pages.
"Notice of Allowance", U.S. Appl. No. 16/206,579, dated Jul. 8, 2020, 10 Pages.
"On the Need for More Flexible Configurations Related to CSI Reporting", 3GPP TSG RAN WG1 Meeting #87, R1-1611237, Reno, USA, Nov. 14-18, 2016, Nov. 2016, 6 pages.
"International Preliminary Report on Patentability", Application No. PCT/US2019/063240, dated Feb. 18, 2021, 8 pages.
"Written Opinion", PCT Application No. PCT/US2019/069129, dated Dec. 14, 2020, 7 pages.
"3GPP TSG RAN WG4 25.942 V2.0.0: "RF System Scenarios"", TSG RAN Working Group 4 (Radio) Meeting #8, Oct. 1999, 65 pages.
"International Preliminary Report on Patentability", Application No. PCT/US2019/069129, dated Apr. 7, 2021, 14 pages.
"International Preliminary Report on Patentability", Application No. PCT/US2019/063081, dated May 25, 2021, 9 pages.
"International Preliminary Report on Patentability", Application No. PCT/US2020/014638, dated Jul. 27, 2021, 7 pages.
"Foreign Office Action", CN Application No. 201980069427.8, dated Oct. 18, 2021, 12 pages.

* cited by examiner

DISENGAGED-MODE ACTIVE COORDINATION SET MANAGEMENT

BACKGROUND

The evolution of wireless communication to fifth generation (5G) and sixth generation (6G) standards and technologies provides higher data rates and greater capacity, with improved reliability and lower latency, which enhances mobile broadband services. 5G and 6G technologies also provide new classes of services for vehicular, fixed wireless broadband, and the Internet of Things (IoT).

A unified air interface, which utilizes licensed, unlicensed, and shared license radio spectrum, in multiple frequency bands, is one aspect of enabling the capabilities of 5G and 6G systems. The 5G and 6G air interface utilizes radio spectrum in bands below 1 GHz (sub-gigahertz), below 6 GHz (sub-6 GHz), and above 6 GHz. Radio spectrum above 6 GHz includes millimeter wave (mmWave) frequency bands that provide wide channel bandwidths to support higher data rates for wireless broadband.

To increase data rates, throughput, and reliability for a user equipment, 5G and 6G systems support various forms of wireless connectivity that use multiple radio links between base stations and the user equipment. Techniques such as dual connectivity (DC) or coordinated multipoint (CoMP) communications, often coupled with beamformed signals, can improve data rates, throughput, and reliability, especially as received signal strengths decease for the user equipment near the edge of cells. The use of these radio link configurations increases the complexity of mobility management to maintain high data rates and reliability for the user equipment.

Conventional mobility management techniques are based on base station neighbor relationships and use handovers to maintain connectivity for the user equipment. However, conventional handover techniques based on base station neighbor relationships require a user equipment to perform neighbor cell measurements and cell selection and reselection procedures while the user equipment is in idle mode, which expends some of the finite battery power of the equipment when the user equipment is not communicating over the wireless network.

SUMMARY

This summary is provided to introduce simplified concepts of disengaged-mode active coordination set management. The simplified concepts are further described below in the Detailed Description. This summary is not intended to identify essential features of the claimed subject matter, nor is it intended for use in determining the scope of the claimed subject matter.

In some aspects, a method for a user equipment to maintain an Active Coordination Set (ACS) for joint wireless communication between the user equipment and multiple base stations that are included in the ACS is described in which the user equipment receives a message including a resource configuration for an ACS Disengaged-mode Reference Signal (ADRS). The user equipment transitions to a disengaged mode and receives the ADRS. The user equipment determines that an updated ACS is required, signals a request for the updated ACS, and receives the updated ACS.

In another aspect, a method for managing an Active Coordination Set (ACS) for a user equipment by a master base station is described in which the master base station configures resources for a resource configuration for an ACS Disengaged-mode Reference Signal (ADRS) and transmits a message to the user equipment including the resource configuration for the ADRS. The master base station transmits the ADRS using the resource configuration and, in response to transmitting the ADRS, the master base station receives a request for an updated ACS, and transmits the updated ACS.

BRIEF DESCRIPTION OF THE DRAWINGS

Aspects of disengaged-mode active coordination set management are described with reference to the following drawings. The same numbers are used throughout the drawings to reference like features and components.

DETAILED DESCRIPTION

Figure 1:
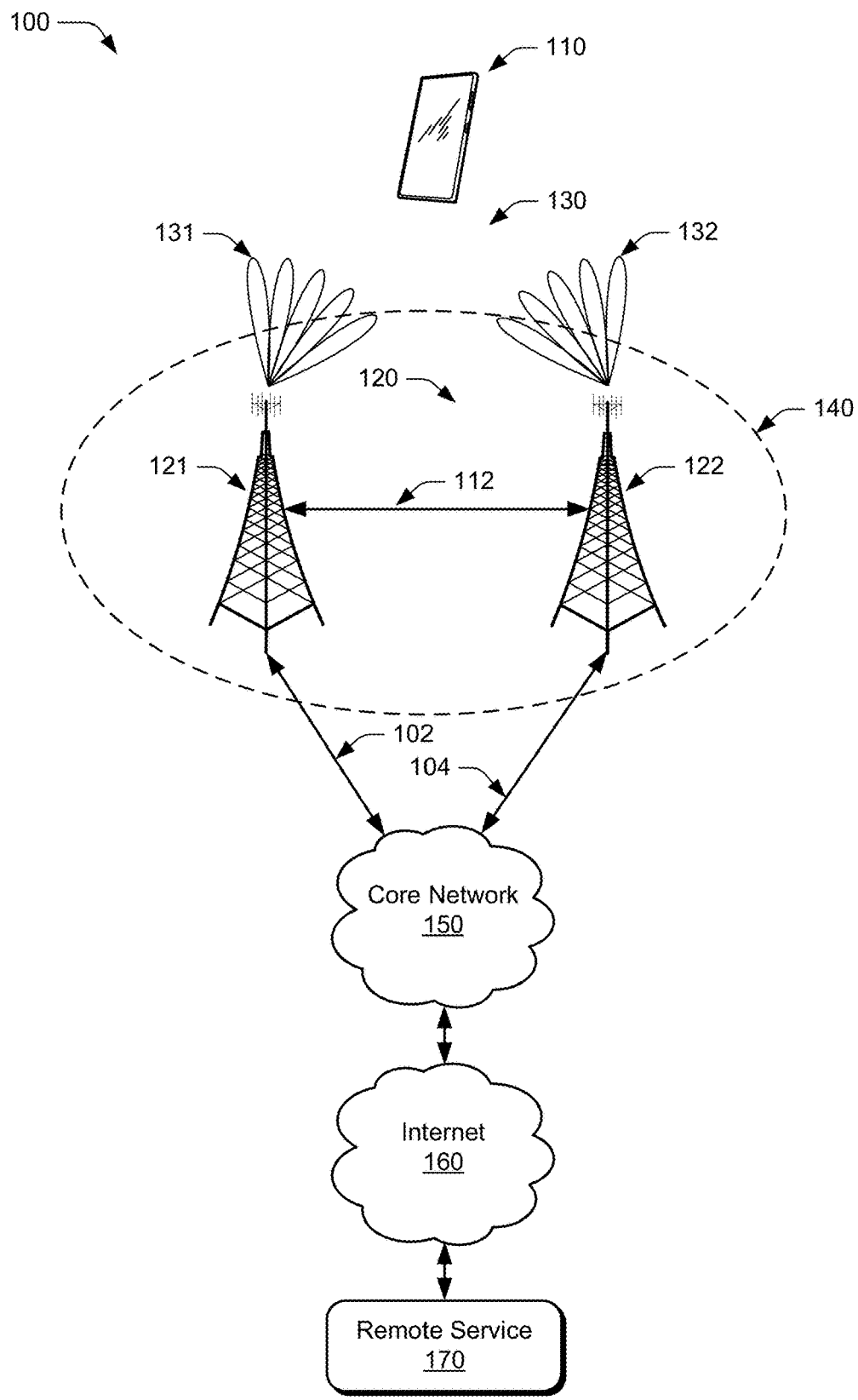
FIG. 1 illustrates an example wireless network system in which various aspects of disengaged-mode active coordination set management can be implemented.

This document describes methods, devices, systems, and means for disengaged-mode active coordination set (ACS) management. A user equipment (UE) uses an ACS for joint wireless communication between the user equipment and multiple base stations included in the ACS. The user equipment receives a resource configuration for an ACS Disengaged-mode Reference Signal (ADRS). The user equipment transitions to a disengaged mode and, using the resource configuration, receives the ADRS. The user equipment determines that an updated ACS is required, transmits a message or a sounding signal indicating the need for the updated ACS, and in response receives the updated ACS from a master base station.

In aspects, an Active Coordination Set (ACS) is a user equipment-specific set of 5G and/or 6G base stations usable for wireless communication by the user equipment. More specifically, the base stations that are included in the ACS are usable for joint transmission and/or reception (joint communication, coordinated communication) between the user equipment and one or more of the base stations in the ACS. The joint transmission and/or reception techniques include CoMP, Single Radio Access Technology (RAT) Dual Connectivity (single-RAT DC), and/or Multi-Radio Access Technology Dual Connectivity (MR-DC).

As channel conditions change for the user equipment, the user equipment, a master base station, and/or a core network function can add or remove base stations from the ACS while the user equipment concurrently communicates with base stations in the ACS that provide usable link quality. Based on these changes to the ACS, the master base station can add or remove base stations from the joint communication with the user equipment without performing a handover that interrupts data communication with the user equipment.

An ACS can include a number of base stations that cover a relatively large geographic area (e.g., a few kilometers in diameter), especially when communicating in lower-frequency radio bands. Typically, a new or updated ACS is centered around the geographic location of the user equipment when the UE receives or updates the ACS. By centering the UE in the coverage area of the ACS, small changes in location (e.g., latitude, longitude, altitude) of the UE will not trigger updates to the ACS. This results in the user equipment, the base stations, and/or the core network consuming fewer resources for mobility management.

By using the ACS to provide seamless mobility with fewer handovers, the user equipment can avoid performing at least some cell measurements or cell (re)selection while in a disengaged mode. While in the disengaged mode, the user equipment monitors an ACS Disengaged-mode Reference Signal (ADRS) that is transmitted jointly by the base stations in the ACS. By using joint transmission of the ADRS, the user equipment receives a stronger signal for the ADRS, further reducing the power consumption of the user equipment during the disengaged mode.

The base stations in the ACS can also jointly transmit paging channel information and/or System Information Blocks (SIBs) to the user equipment. Using this joint transmission for paging channel information and/or SIBs improves signal strength at the user equipment for these transmissions, reducing the power consumption of the user equipment to receive paging channel information and SIBs.

During the disengaged mode, the user equipment monitors the received signal strength (e.g., RSSI) of the ADRS, and if the RSSI of the ADRS falls below a threshold, the user equipment transmits an ACS Disengaged-mode Update Signal (ADUS) to serve as a sounding signal to nearby base stations. Base stations receiving the ADUS evaluate the ADUS and provide the evaluations to a master base station in the ACS and/or an ACS Server. The master base station and/or the ACS Server determine if the user equipment should use a different ACS. The master base station transmits a new ACS to the user equipment. Providing a new ACS to the user equipment reduces the measurements and procedures that the user equipment would need to perform to create a new ACS, reducing power consumption by the user equipment in the disengaged mode.

The master base station in the ACS allocates air interface resources for the ADRS and the ADUS. The master base station allocates resources for the ADUS in the same bandwidth part used for the ADRS and downlink idle-mode signals, such as paging signals, to enable the user equipment to monitor a single radio frequency in the disengaged mode. The master base station can allocate the air interface resources for the ADRS and the ADUS in a lower frequency band, such as the below 1 GHz (sub-gigahertz) radio band. By allocating the air interface resources for the ADRS and the ADUS in a lower-frequency radio band and/or in the same bandwidth part, the user equipment can reduce its power consumption in the disengaged mode. The resources for the ADUS may be semi-statically allocated. Optionally or additionally, the resources for the ADUS can be allocated for use by additional base stations, which are not included in the ACS, to provide a larger set of potential base stations to receive the ADUS.

While features and concepts of the described systems and methods for disengaged-mode active coordination set management can be implemented in any number of different environments, systems, devices, and/or various configurations, aspects of disengaged-mode active coordination set management are described in the context of the following example devices, systems, and configurations.

Example Environment

FIG. 1 illustrates an example environment 100 in which various aspects of disengaged-mode active coordination set management can be implemented. The example environment 100 includes a user equipment 110 (UE 110) that communicates with one or more base stations 120 (illustrated as base stations 121 and 122), through one or more wireless communication links 130 (wireless link 130), illustrated as wireless links 131 and 132. In this example, the user equipment 110 is implemented as a smartphone. Although illustrated as a smartphone, the user equipment 110 may be implemented as any suitable computing or electronic device, such as a mobile communication device, a modem, cellular phone, gaming device, navigation device, media device, laptop computer, desktop computer, tablet computer, smart appliance, or vehicle-based communication system. The base stations 120 (e.g., an Evolved Universal Terrestrial Radio Access Network Node B, E-UTRAN Node B, evolved Node B, eNodeB, eNB, Next Generation Node B, gNode B, gNB, a 6G node B, or the like) may be implemented in a macrocell, microcell, small cell, picocell, and the like, or any combination thereof.

The base stations 120 communicate with the user equipment 110 via the wireless links 131 and 132, which may be implemented as any suitable type of wireless link. The wireless links 131 and 132 can include a downlink of data and control information communicated from the base stations 120 to the user equipment 110, an uplink of other data and control information communicated from the user equipment 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), 6G, and so forth. Multiple wireless links 130 may be aggregated in a carrier aggregation to provide a higher data rate for the user equipment 110. Multiple wireless links 130 from multiple base stations 120 may be configured for Coordinated Multipoint (CoMP) communication with the user equipment 110. Additionally, multiple wireless links 130 may be configured for single-radio access technology (RAT) (single-RAT) dual connectivity (single-RAT-DC) or multi-RAT dual connectivity (MR-DC).

The base stations 120 are collectively a Radio Access Network 140 (RAN, Evolved Universal Terrestrial Radio Access Network, E-UTRAN, 5G NR RAN or NR RAN). The base stations 121 and 122 in the RAN 140 are connected to a core network 150, such as a Fifth Generation Core (5GC) or 6G core network. The base stations 121 and 122 connect, at 102 and 104 respectively, to the core network 150 via an NG2 interface (or a similar 6G interface) for control-plane signaling and via an NG3 interface (or a similar 6G interface) for user-plane data communications. In addition to connections to core networks, base stations 120 may communicate with each other via an Xn Application Protocol (XnAP), at 112, to exchange user-plane and control-plane data. The user equipment 110 may also connect, via the core network 150, to public networks, such as the Internet 160 to interact with a remote service 170.

Example Devices

Figure 2:
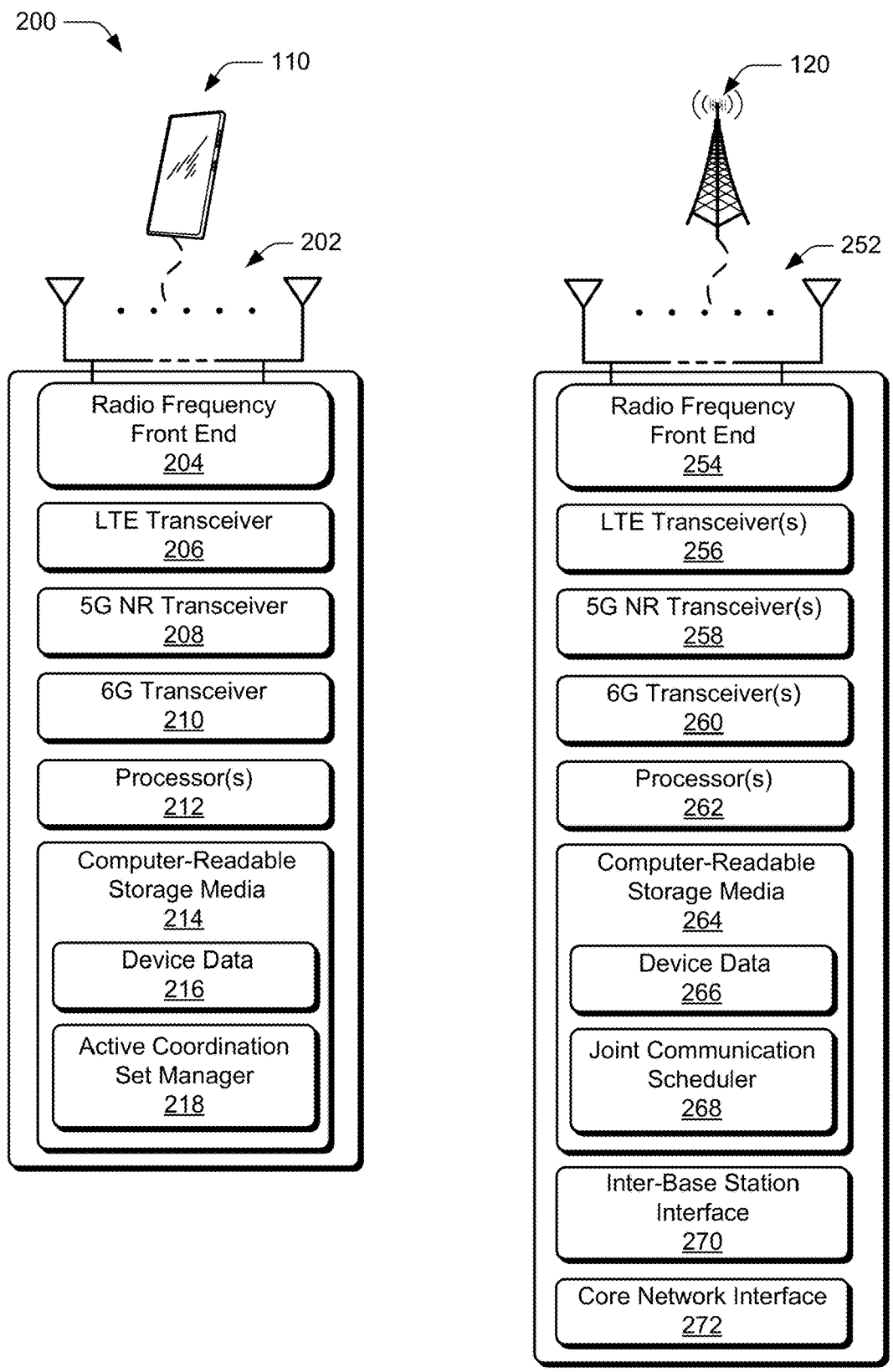
FIG. 2 illustrates an example device diagram that can implement various aspects of disengaged-mode active coordination set management.

FIG. 2 illustrates an example device diagram 200 of the user equipment 110 and the base stations 120. The user equipment 110 and the base stations 120 may include additional functions and interfaces that are omitted from FIG. 2 for the sake of clarity. The user equipment 110 includes antennas 202, a radio frequency front end 204 (RF front end 204), an LTE transceiver 206, a 5G NR transceiver 208, and a 6G transceiver 210 for communicating with base stations 120 in the RAN 140. The RF front end 204 of the user equipment 110 can couple or connect the LTE transceiver 206, the 5G NR transceiver 208, and the 6G transceiver 210 to the antennas 202 to facilitate various types of wireless communication. The antennas 202 of the user equipment 110 may include an array of multiple antennas that are configured similarly to or differently from each other. The antennas 202 and the RF front end 204 can be tuned to, and/or be tunable to, one or more frequency bands defined by the 3GPP LTE, 5G NR, and 6G communication standards and implemented by the LTE transceiver 206, the 5G NR transceiver 208, and/or the 6G transceiver 210. Additionally, the antennas 202, the RF front end 204, the LTE transceiver 206, the 5G NR transceiver 208, and/or the 6G transceiver 210 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE, 5G NR, and 6G communication standards.

The user equipment 110 also includes processor(s) 212 and computer-readable storage media 214 (CRM 214). The processor 212 may be a single core processor or a multiple core processor composed of a variety of materials, such as silicon, polysilicon, high-K dielectric, copper, and so on. The computer-readable storage media described herein excludes propagating signals. CRM 214 may include any suitable memory or storage device such as random-access memory (RAM), static RAM (SRAM), dynamic RAM (DRAM), non-volatile RAM (NVRAM), read-only memory (ROM), or Flash memory useable to store device data 216 of the user equipment 110. The device data 216 includes user data, multimedia data, beamforming codebooks, applications, and/or an operating system of the user equipment 110, which are executable by processor(s) 212 to enable user-plane communication, control-plane signaling, and user interaction with the user equipment 110.

In some implementations, the CRM 214 may also include an active coordination set (ACS) manager 218. The ACS manager 218 can communicate with the antennas 202, the RF front end 204, the LTE transceiver 206, the 5G NR transceiver 208, and/or the 6G transceiver 210 to monitor the quality of the wireless communication links 130, such as the ADRS. Based on this monitoring, the ACS manager 218 can determine to trigger the transmission of the ADUS.

The device diagram for the base stations 120, shown in FIG. 2, includes a single network node (e.g., a gNode B).

The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, one or more 5G NR transceivers 258, and/or one or more 6G transceivers 260 for communicating with the UE 110. The RF front end 254 of the base stations 120 can couple or connect the LTE transceivers 256, the 5G NR transceivers 258, and/or the 6G transceivers 260 to the antennas 252 to facilitate various types of wireless communication. The antennas 252 of the base stations 120 may include an array of multiple antennas that are configured similarly to or differently from each other. The antennas 252 and the RF front end 254 can be tuned to, and/or be tunable to, one or more frequency band defined by the 3GPP LTE, 5G NR, and 6G communication standards, and implemented by the LTE transceivers 256, one or more 5G NR transceivers 258, and/or one or more 6G transceivers 260. Additionally, the antennas 252, the RF front end 254, the LTE transceivers 256, one or more 5G NR transceivers 258, and/or one or more 6G transceivers 260 may be configured to support beamforming, such as Massive-MIMO, for the transmission and reception of communications with the UE 110.

The base stations 120 also include processor(s) 262 and computer-readable storage media 264 (CRM 264). The processor 262 may be a single core processor or a multiple core processor composed of a variety of materials, such as silicon, polysilicon, high-K dielectric, copper, and so on. CRM 264 may include any suitable memory or storage device such as random-access memory (RAM), static RAM (SRAM), dynamic RAM (DRAM), non-volatile RAM (NVRAM), read-only memory (ROM), or Flash memory useable to store device data 266 of the base stations 120. The device data 266 includes network scheduling data, radio resource management data, beamforming codebooks, applications, and/or an operating system of the base stations 120, which are executable by processor(s) 262 to enable communication with the user equipment 110.

CRM 264 also includes a joint communication scheduler 268. Alternately or additionally, the joint communication scheduler 268 may be implemented in whole or part as hardware logic or circuitry integrated with or separate from other components of the base stations 120. In at least some aspects, the joint communication scheduler 268 configures the LTE transceivers 256, the 5G NR transceivers 258, and the 6G transceiver(s) 260 for communication with the user equipment 110, as well as communication with a core network, such as the core network 150, and routing user-plane and control-plane data for joint communication. Additionally, the joint communication scheduler 268 may allocate air interface resources and schedule communications for the UE 110 and base stations 120 in the ACS when the base station 120 is acting as a master base station for the base stations 120 in the ACS.

The base stations 120 include an inter-base station interface 270, such as an Xn and/or X2 interface, which the joint communication scheduler 268 configures to exchange user-plane and control-plane data between other base stations 120, to manage the communication of the base stations 120 with the user equipment 110. The base stations 120 include a core network interface 272 that the joint communication scheduler 268 configures to exchange user-plane and control-plane data with core network functions and/or entities.

Figure 3:
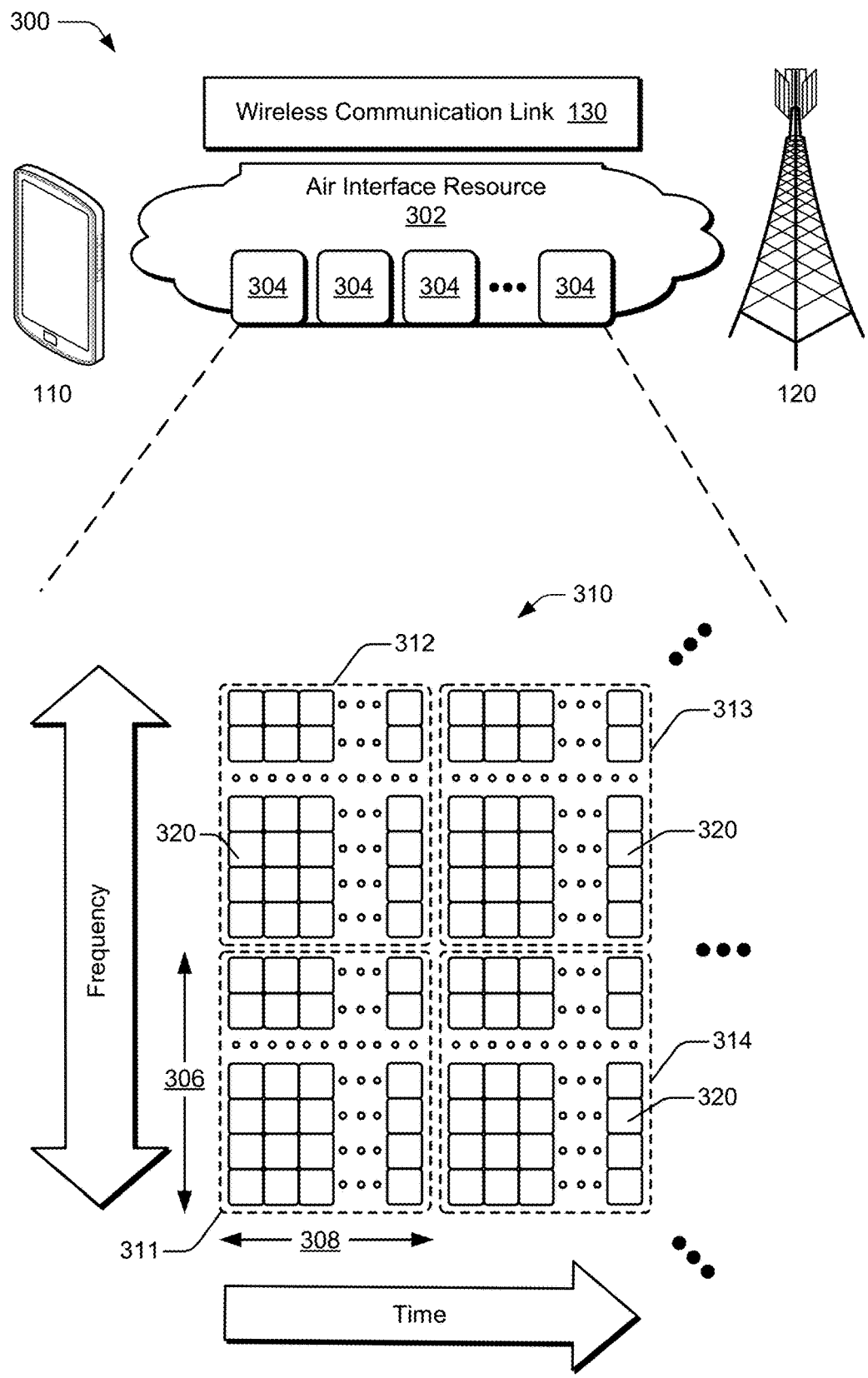
FIG. 3 illustrates an air interface resource that extends between a user equipment and a base station and with which various aspects of disengaged-mode active coordination set management techniques can be implemented.

FIG. 3 illustrates an air interface resource that extends between a user equipment and a base station and with which various aspects of disengaged-mode active coordination set management can be implemented. The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base stations 120 allocate portions (e.g., the resource units 304) of the air interface resource 302 for uplink and downlink communications. Each resource block 310 of network access resources may be allocated to support respective wireless communication links 130 of multiple user equipment 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, multiple user equipment 110 (one of which is shown) are communicating with the base stations 120 (one of which is shown) through access provided by portions of the air interface resource 302. The joint communication scheduler 268 (shown in FIG. 2) may determine a respective data-rate, type of information, or amount of information (e.g., data or control information) to be communicated (e.g., transmitted) by the user equipment 110. For example, the joint communication scheduler 268 can determine that each user equipment 110 is to transmit at a different respective data rate or transmit a different respective amount of information. The joint communication scheduler 268 then allocates one or more resource blocks 310 to each user equipment 110 based on the determined data rate or amount of information.

Additionally, or in the alternative to block-level resource grants, the joint communication scheduler 268 may allocate resource units at an element-level. Thus, the joint communication scheduler 268 may allocate one or more resource elements 320 or individual subcarriers to different user equipment 110. By so doing, one resource block 310 can be allocated to facilitate network access for multiple user equipment 110. Accordingly, the joint communication scheduler 268 may allocate, at various granularities, one or up to all subcarriers or resource elements 320 of a resource block 310 to one user equipment 110 or divided across multiple user equipment 110, thereby enabling higher network utilization or increased spectrum efficiency.

The joint communication scheduler 268 can therefore allocate air interface resource 302 by resource unit 304, resource block 310, frequency carrier, time interval, resource element 320, frequency subcarrier, time subinterval, symbol, spreading code, some combination thereof, and so forth. Based on respective allocations of resource units 304, the joint communication scheduler 268 can transmit respective messages to the multiple user equipment 110 indicating the respective allocation of resource units 304 to each user equipment 110. Each message may enable a respective user equipment 110 to queue the information or configure the LTE transceiver 206, the 5G NR transceiver 208, and/or the 6G transceiver 210 to communicate via the allocated resource units 304 of the air interface resource 302.

User Equipment States

Figure 4:
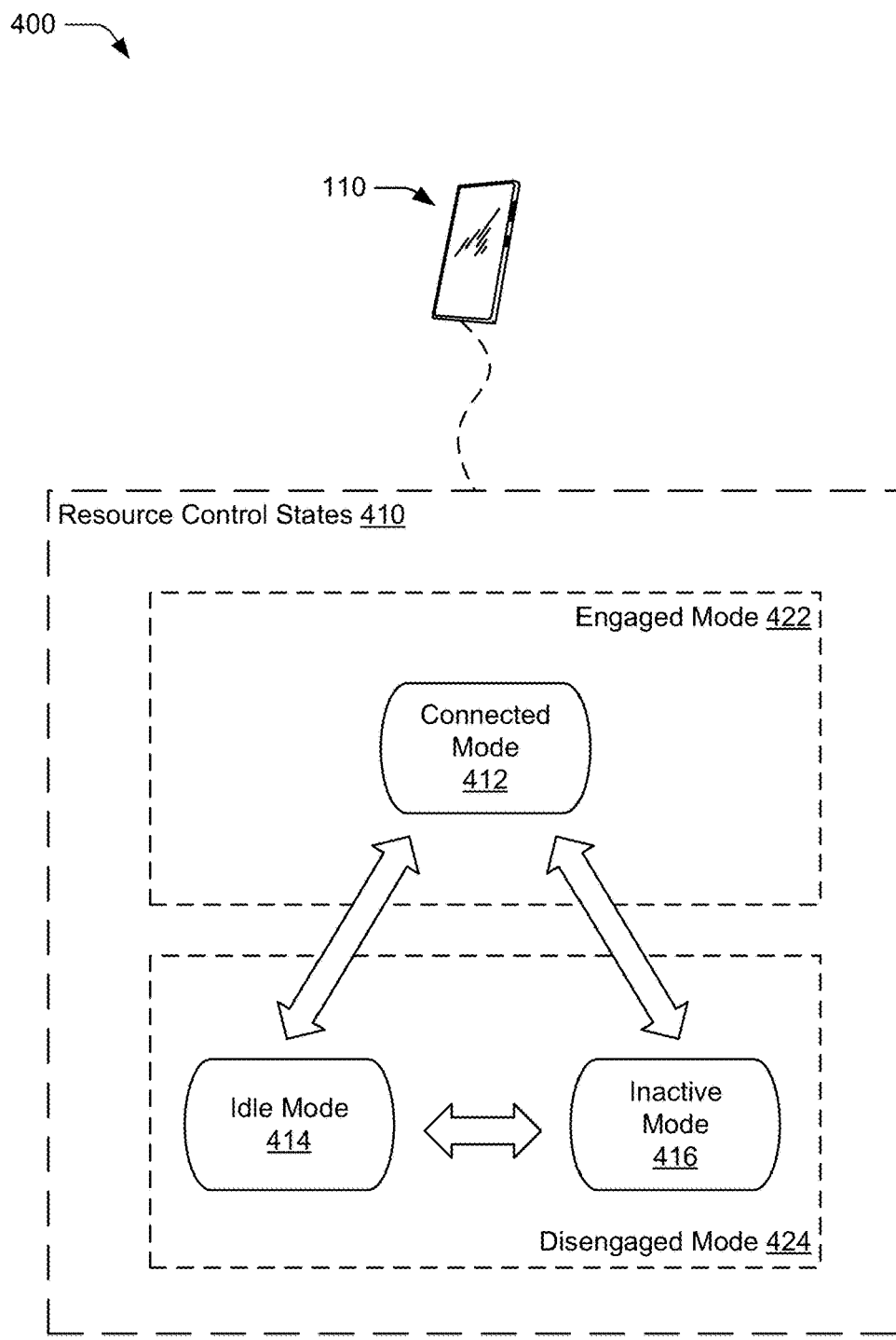
FIG. 4 illustrates example user equipment states which may implement various aspects of disengaged-mode active coordination set management.

FIG. 4 illustrates example user equipment states 400 which may benefit from aspects of disengaged-mode active coordination set management. A wireless network operator provides its telecommunication services to user equipment devices through a wireless network. To communicate wirelessly with the network, a user equipment 110 utilizes a radio resource control (RRC) procedure to establish a connection to the network via a cell (e.g., a base station, a serving cell). Upon establishing the connection to the network via the base station 120, the UE 110 enters a connected mode (e.g., RRC connected mode, RRC_CONNECTED state, NR-RRC CONNECTED state, E-UTRA RRC CONNECTED state).

The UE 110 operates according to different resource control states 410. Different situations may occur that cause the UE 110 to transition between the different resource control states 410 as determined by the radio access technology. Examples of the resource control states 410 illustrated in FIG. 4 include a connected mode 412, an idle mode 414, and an inactive mode 416. A user equipment 110 is either in the connected mode 412 or in the inactive mode 416 when an RRC connection is active. If an RRC connection is not active, then the user equipment 110 is in the idle mode 414.

In establishing an RRC connection, the user equipment 110 may transition from the idle mode 414 to the connected mode 412. After establishing the connection, the user equipment 110 may transition (e.g., upon connection inactivation) from the connected mode 412 to an inactive mode 416 (e.g., RRC inactive mode, RRC_INACTIVE state, NR-RRC INACTIVE state) and the user equipment 110 may transition (e.g., via an RRC connection resume procedure) from the inactive mode 416 to the connected mode 412. After establishing the connection, the user equipment 110 may transition between the connected mode 412 to an idle mode 414 (e.g., RRC idle mode, RRC_IDLE state, NR-RRC IDLE state, E-UTRA RRC IDLE state), for instance upon the network releasing the RRC connection. Further, the user equipment 110 may transition between the inactive mode 416 and the idle mode 414.

Further, the UE 110 may be in an engaged mode 422 or may be in a disengaged mode 424. As used herein, an engaged mode 422 is a connected mode (e.g., the connected mode 412) and a disengaged mode 424 is an idle, disconnected, connected-but-inactive, or connected-but-dormant mode (e.g., idle mode 414, inactive mode 416). In some cases, in the disengaged mode 424, the UE 110 may still be Network Access Stratum (NAS) registered with radio bearer active (e.g., inactive mode 416).

Each of the different resource control states 410 may have different quantities or types of resources available, which may affect power consumption within the UE 110. In general, the connected mode 412 represents the UE 110 actively connected to (engaged with) the base station 120. In the inactive mode 416, the UE 110 suspends connectivity with the base station 120 and retains information that enables connectivity with the base station 120 to be quickly re-established. In the idle mode 414 the UE 110 releases the connection with the base station 120.

Some of the resource control states 410 may be limited to certain radio access technologies. For example, the inactive mode 416 may be supported in LTE Release 15 (eLTE), 5G NR, and 6G, but not in 3G or previous generations of 4G standards. Other resource control states may be common or compatible across multiple radio access technologies, such as the connected mode 412 or the idle mode 414.

Active Coordination Set

Figure 5:
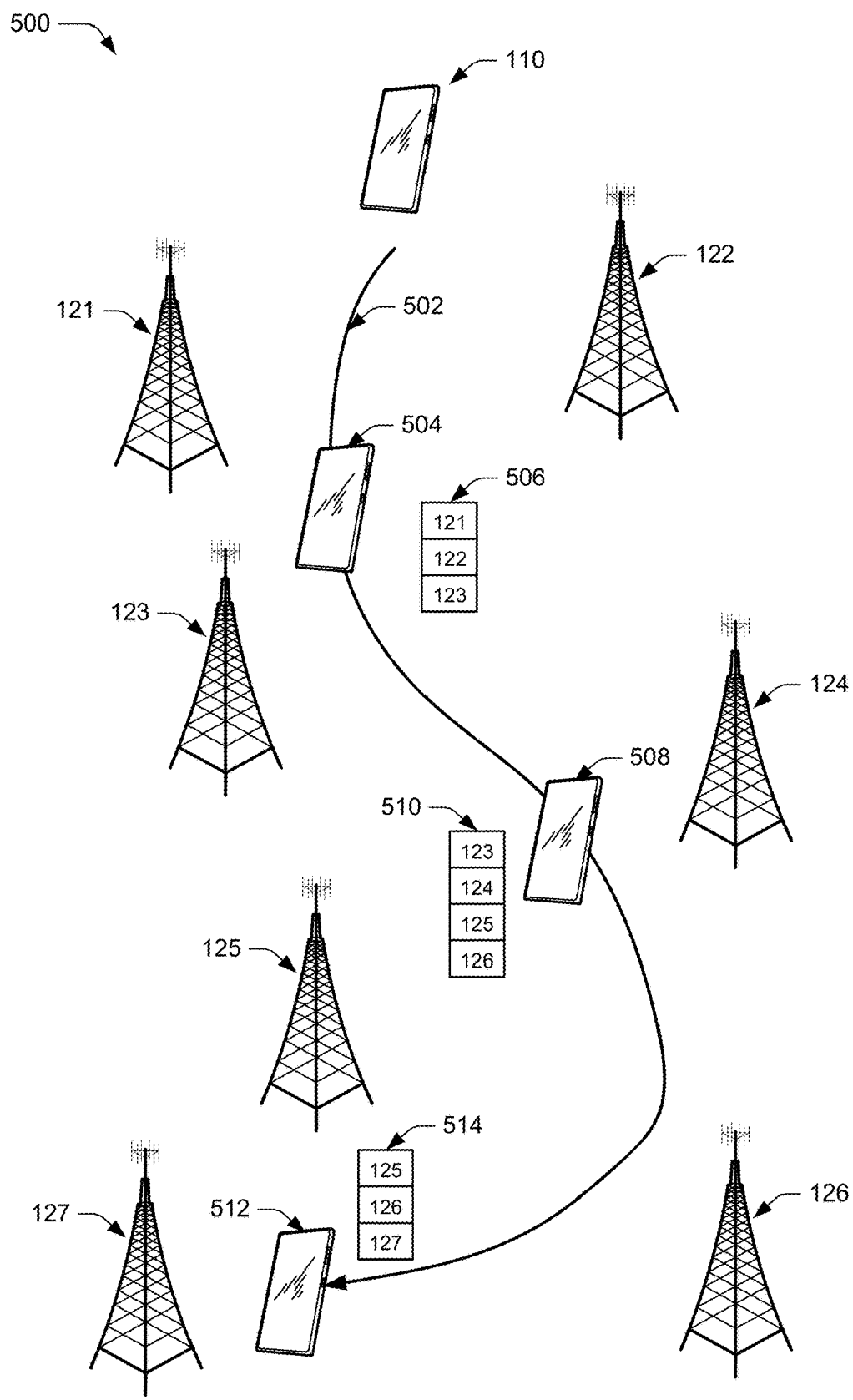
FIG. 5 illustrates an example of a user equipment, in an engaged mode, moving through a radio access network that includes multiple base stations in accordance with aspects of disengaged-mode active coordination set management techniques.

In aspects, disengaged-mode active coordination set management is described with which the user equipment 110, while in the engaged mode 422, measures the link quality of candidate base stations 120 to determine which base stations 120 to include in the ACS. FIG. 5 illustrates an example environment 500 in which a user equipment 110, in the engaged mode 422, is moving through a radio access network (RAN) that includes multiple base stations 120, illustrated as base stations 121-127. These base stations may utilize different technologies (e.g., LTE, 5G NR, 6G) at a variety of frequencies (e.g., sub-gigahertz, sub-6 GHz, and above 6 GHz bands and sub-bands).

For example, the user equipment 110 follows a path 502 through the RAN 140 while periodically measuring the link quality of base stations 120 that are currently in the ACS and candidate base stations 120 that the UE 110 may add to the ACS. For example, at position 504, the ACS at 506 includes the base stations 121, 122, and 123. As the UE 110 continues to move, at position 508, the UE 110 has deleted base station 121 and base station 122 from the ACS and added base stations 124, 125, and 126, as shown at 510. Continuing along the path 502, the UE 110, at position 512, has deleted the base stations 123 and 124 and added the base station 127, as shown in the ACS at 514.

Figure 6:
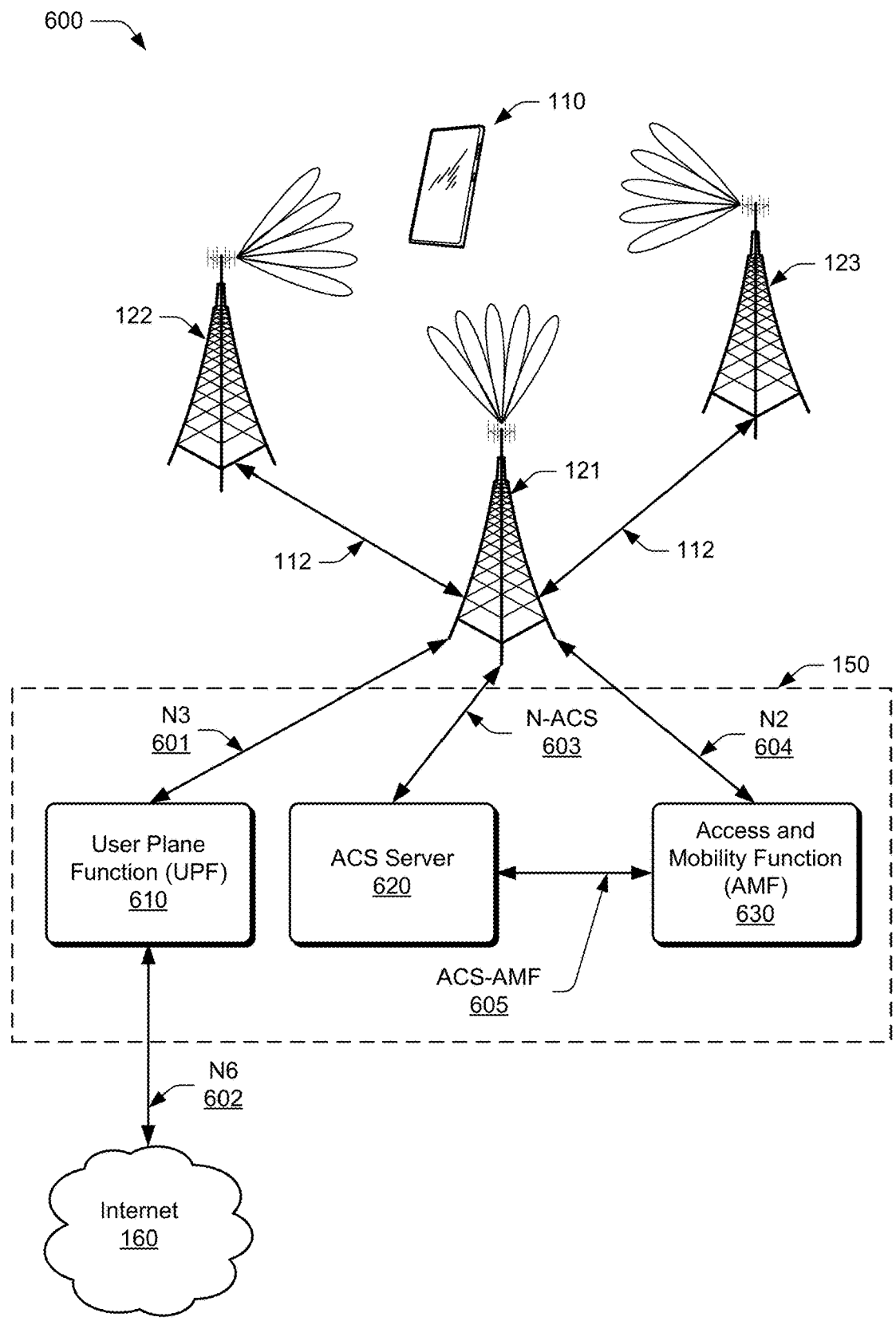
FIG. 6 illustrates an example environment in which various aspects of disengaged-mode active coordination set management can be implemented.

FIG. 6 illustrates an example environment 600 in which various aspects of disengaged-mode active coordination set management can be implemented. The user equipment 110, which is in is the engaged mode 422, is communicating using joint transmission and/or reception (joint communication, coordinated communication) with the three base stations 121, 122, and 123. The base station 121 is acting as a master base station for the joint transmission and/or reception. Which base station is the master base station is transparent to the UE 110 and the master base station can change as base stations are added and/or removed from the ACS. The master base station coordinates control-plane and user-plane communications for the joint communication with the UE 110, via the Xn interfaces 112 (or a similar 6G interface) to the base stations 122 and 123 and maintains the user-plane context between the UE 110 and the core network 150. The coordination may be performed using proprietary or standards-based messaging, procedures, and/or protocols.

The master base station schedules air interface resources for the joint communication between the UE 110 and the base stations 121, 122, and 123, based on the ACS associated with the UE 110. The master base station (base station 121) connects, via an N3 interface 601 (or a 6G equivalent interface) to the User Plane Function 610 (UPF 610) in the core network 150 for the communication of user-plane data to and from the user equipment 110. The master base station distributes the user-plane data to all the base stations in the joint communication via the Xn interfaces 112. The UPF 610 is further connected to a data network, such as the Internet 160 via the N6 interface 602. All of the base stations 120 in the ACS or any subset of the base stations 120 in the ACS can send downlink data to the UE 110. All of the base stations 120 in the ACS or any subset of the base stations 120 in the ACS can receive uplink data from the UE 110.

When the user equipment 110 creates or modifies an ACS, the user equipment 110 communicates the created ACS or the ACS modification to an ACS Server 620 that stores the ACS for each user equipment 110 operating in the RAN 140. Although shown in the core network 150, alternatively the ACS Server 620 may be an application server located outside the core network 150. The user equipment 110 communicates the ACS or ACS modification via the master base station (base station 121) which is connected to the ACS Server 620 via an N-ACS interface 603. Optionally or alternatively, the user equipment 110 communicates the created ACS or ACS modification to the ACS Server 620 via the Access and Mobility Function 630 (AMF 630) which is connected to the master base station (base station 121) via an N2 interface 604. The AMF 630 relays ACS-related communications to and from the ACS Server 620 via an ACS-AMF interface 605. ACS data between the user equipment 110 and the ACS Server 620 can be communicated via Radio Resource Control (RRC) communications, Non-Access Stratum (NAS) communications, or application-layer communications.

The ACS Server 620 may be implemented as a single network node (e.g., a server). The functionality of the ACS Server 620 may be distributed across multiple network nodes and/or devices and may be distributed in any fashion suitable to perform the functions described herein. The ACS Server 620 includes processor(s) and computer-readable storage media. The processor may be a single core processor, or a multiple core processor composed of a variety of materials, such as silicon, polysilicon, high-K dielectric, copper, and so on. CRM may include any suitable memory or storage device such as random-access memory (RAM), static RAM (SRAM), dynamic RAM (DRAM), non-volatile RAM (NVRAM), read-only memory (ROM), hard disk drives, or Flash memory useful to ACS and related data. The CRM includes applications and/or an operating system of the ACS Server 620, which are executable by the processor(s) to enable communication with the user equipment 110, the master base station 121, and the AMF 630. The ACS Server 620 includes one or more network interfaces for communication with the master base station 121, the AMF 630, and other devices in the core network 150, the user equipment 110, and/or devices in the RAN 140.

Whenever there is a change to the contents of the ACS for any particular user equipment 110, the ACS Server 620 sends a copy of the modified ACS to the master base station (base station 121) for that UE. The master base station uses the ACS to schedule air interface resources for joint communication with the user equipment 110. For example, when a new base station is added to the ACS or an existing base station in the ACS is deleted, the master base station allocates air interface resources for the new base station to participate in the joint communication or deallocates resources for the deleted base station. The master base station relays user-plane data based on the ACS received from the ACS Server 620. Continuing with the example, the master base station starts routing user-plane data to the new base station added to the ACS or terminates relaying data to the existing base station that was removed from the ACS.

In aspects, the initial ACS for the user equipment 110 can be established by the UE 110 during or after the UE 110 performs the attach procedure to connect to the RAN 140. For example, the UE 110 can initialize the ACS with the base stations 120 included in the neighbor relation table of the base station through which the UE 110 attaches to the RAN 140. In another example, the UE 110 considers the base stations 120 included in the neighbor relation table as candidates for the ACS and the measures the link quality of each candidate base station before adding a candidate base station to the ACS. In a further example, the user equipment 110 queries the ACS Server 620 for the last ACS used by the user equipment 110. The UE 110 then validates the entries in the last-used ACS to determine which, if any, entries of the last-used ACS are usable for communication and inclusion in the ACS. In another example, the UE 110, measures the link quality of any base stations 120 from the previous ACS that are within communication range and populates the ACS with one or more of the base stations 120 that exceed a threshold for inclusion (e.g., above a threshold for a Received Signal Strength Indicator (RSSI), a Reference Signal Received Power (RSRP), or a Reference Signal Received Quality (RSRQ)).

The user equipment 110 adds or deletes a base station 120 from the ACS by sending an ACS modification message to the ACS Server 620. The ACS modification message includes an identifier for a base station to add or delete from the ACS along with and indicator to either add or delete the identified base station. Optionally, or additionally, the ACS modification message may include identifiers of multiple base stations with corresponding add/delete indicators for each base station. Other information useful to the management of the ACS may be stored in or with the ACS, such as timestamps for entries in the ACS, geographic location information from the UE, a UE identifier, identification information for the current master base stations, and the like.

The ACS Server 620 receives the ACS modification message from the UE 110 (via the current master bases station) and performs the requested modification to an ACS record for the UE 110 that is stored by the ACS Server 620. After receiving the ACS modification message, the ACS Server 620 sends a modified copy of the ACS for the UE 110 to the master base station (base station 121) via the N-ACS interface 603. Optionally or alternatively, the ACS Server 620 may send only the modification of the ACS to the master base station which causes the master base station to update its copy of the ACS. The joint communication scheduler 268 in the master base station uses the updated or modified ACS to modify the scheduling of resources and joint communications for the base stations 120 in the ACS. The master base station can perform real-time scheduling of resources within the ACS of the user equipment 110 to respond to changing channel conditions or communication requirements with low latency requirements.

ACS Management in Disengaged Mode

In aspects, before the user equipment 110 transitions to the disengaged mode 424, the master base station 121 configures air interface resources for the ADRS, which is specific to the ACS of the user equipment 110, and the ADUS. The master base station 121 transmits the resource configuration to the user equipment 110 and sends the resource configuration to the base stations 120 in the ACS. Alternatively, the master base station 121 sends the resource configuration to the base stations 120 in the ACS for joint transmission to the user equipment 110. The master base station 121 or the base stations 120 in the ACS transmit the resource configuration in a layer one message, a layer two message, or a layer three message to the UE 110. Optionally, or additionally the master base station 121 can change the radio frequency (RF) channel the UE 110 monitors by sending a resource configuration with resources allocated on the new RF channel.

The base stations 120 in the ACS jointly transmit the ADRS periodically, according to the resource configuration. Additionally or optionally, the base stations 120 in the ACS can jointly transmit paging channel information and/or System Information Blocks (SIBs) to the user equipment 110. The master base station 121 may be aware or unaware that the UE 110 has transitioned to the disengaged mode 424. For example, the master base station 121 is aware of the transition to the disengaged mode 424, when the master base station 121 uses Radio Resource Control (RRC) signaling to release the UE 110 from the connected mode 412, which causes the UE 110 to transition the disengaged mode 424. In another example, the master base station 121 can infer that the UE 110 has transitioned to the disengaged mode 424, for example, if the UE 110 fails to respond to a downlink communication, such as a page.

In one aspect, the base stations 120 in the ACS jointly transmit the ADRS periodically when the master base station 121 determines that the UE 110 is in the disengaged mode 424. In another example, the master base station 121 is unaware, at least for a period of time, of the transition to the UE 110 to the disengaged mode 424, such as the UE 110 experiencing a radio link failure. Optionally or alternatively, resources for the ADRS and ADUS can be semi-statically allocated and the base stations 120 in the ACS jointly transmit the ADRS periodically regardless of the resource control state 410 of the UE 110. In this alternative, the periodic ADRS transmissions enable the UE 110 to more quickly reestablish a network connection with the ACS in the event of a radio link failure or other unexpected transition to the disengaged mode 424.

After the user equipment 110 transitions to the disengaged mode 424, the user equipment 110 periodically monitors the ADRS to determine if the ACS provides a usable signal for communication via the RAN 140. For example, the user equipment 110 measures a link quality parameter for the received ADRS, such as a Received Signal Strength Indicator (RSSI), a Reference Signal Received Power (RSRP), or a Reference Signal Received Quality (RSRQ). The user equipment 110 can monitor the ADRS each time the user equipment 110 wakes up during a paging cycle.

The user equipment 110 determines if the measured link quality parameter of the ADRS is lower than a threshold value indicative of a minimum link quality for usable communication with the RAN 140. If the measured link quality parameter of the ADRS is lower than the threshold value, the user equipment 110 transmits an ADUS that acts as a sounding signal.

In another aspect, if user equipment 110 determines if the measured link quality parameter of the ADRS is lower than the threshold value indicative of a minimum link quality for usable communication, the user equipment 110 can send a message to the master base station 121 requesting a new ACS. For example, when the user equipment 110 wakes up to monitor for paging messages, the user equipment can transmit a request message to request a new ACS. In one alternative, the ADUS can be transmitted to indicate a request for a new ACS. The request message may include additional parameters, such as a geographic location of the UE 110 that may be used by the master base station 121 and/or the ACS Server 620 to provide an ACS to the UE 110. The request message may be received by any base station 120 in the ACS that can receive the message. The request message can be transmitted in any suitable manner, such as a layer three message, a status flag bit in a layer two information element, as a layer one signal, or the like. Alternatively, the user equipment 110 can determine a current position of the UE 110 (e.g., using a GPS receiver) and, based on a change in location exceeding a distance threshold, determine to transmit the ADUS which may, in some configurations, be interpreted as a request for a new ACS.

The user equipment 110 transmits the ADUS at a low transmit power to reduce power consumption. The master base station 121 can allocate the resources such that the ADUS occupies a narrow frequency bandwidth. The user equipment 110 transmits the ADUS using the narrow bandwidth to reduce power consumption. The master base station 121 can allocate resources for the ADUS in the same or a different bandwidth part as the ADRS. For example, the master base station can allocate resources for the ADUS and the ADRS in the same bandwidth part to enable the UE 110 to monitor a single radio frequency and reduce power consumption.

Base stations, whether in the ACS or not, receive the ADUS and measure an uplink quality parameter of the received ADUS. The base stations 120 that received the ADUS each report the uplink quality parameter to the master base station 121. Based on received uplink quality parameters, the master base station 121 determines that the user equipment 110 requires a new ACS. For example, the master base station 121 may determine a location of the user equipment 110 derived from the reported uplink quality parameters to configure a new ACS for the user equipment 110. The master base station 121 determines the base stations 120 to include in the new ACS to place the center of the new ACS at or near the geographic location of the UE 110. Optionally or additionally, the master base station 121 may know or derive a direction of travel of the UE 110 and determine to include base stations 120 in the ACS along a predicted geographic path of the UE 110.

In an alternative, the master base station 121 or functions in the core network 150 may autonomously determine to assign a new ACS to the user equipment 110. If the master base station 121 and/or the core network 150 determine that the UE 110 has moved to a new location, for example based on the user equipment 110 connecting to a Wi-Fi access point with a location known to the core network 150, the master base station 121 autonomously assigns a new ACS to the UE 110, without interaction with the UE 110 while it is in the disengaged mode 424.

In another aspect, the master base station 121 can query the ACS Server 620 for the new ACS for the user equipment 110. For example, the ACS Server 620 maintains a database of ACSs previously reported by, or on behalf of, the UE 110 and other UEs 110. The master base station 121 queries the ACS Server 620 using the location of the user equipment 110, the set of base stations 120 that received the ADUS, and/or any other suitable query terms. The ACS Server 620 queries the database of ACSs and returns the ACS that is the closest match to the query. The master base station 121 updates its copy of the ACS with the result returned by the ACS Server 620 and sends the ACS to the UE 110.

The ACSs stored in the database of the ACS Server 620 can include ACSs from a variety of sources. The stored ACSs can include ACSs previously reported by various UEs 110 (e.g., crowdsourced from UEs 110 operating in the RAN 140), ACSs previously created on behalf of UEs 110 (e.g., by base stations 120, core network 150 entities or functions, or web-based services), previously created ACSs based on network architecture planning and service provider analysis and assessment, previous ACSs created as an output of Self-Organizing Network (SON) software and services, or the like.

The ACS Server 620 can also include historical information for the UE 110. For example, the ACS server stores location history information for the UE 110. Based on the location history, the ACS Server 620 can derive frequently used travel paths for the UE 110, such as a frequently used path between a home and an office. For example, based on a current location of the UE 110, and a current time and/or day of the week, the ACS Server 620 may conclude that the UE 110 will follow a path from the user's home to the user's office and provides an ACS optimized for that path in order to minimize ACS updates over the frequently traveled route.

The master base station 121 and/or the ACS Server 620 can create an ACS that covers various shapes of geographic areas. For example, the master base station 121 and/or the ACS Server 620 can create an ACS that is generally circular around a current location of the UE 110. The master base station 121 and/or the ACS Server 620 can create an ACS to cover a generally elliptical- or rectangular-shaped geographical area based on a location and direction of movement of the user equipment 110. The master base station 121 and/or the ACS Server 620 can create an ACS that is irregularly-shaped around a frequently-traveled route of the user equipment 110.

The master base station 121 allocates resources for the base stations 120 included in the new ACS and sends the resource configuration to the base stations 120 in the ACS. The base stations 120 in the ACS transmit the new ACS to the user equipment 110, for example, via a paging channel communication. The user equipment 110 transitions to monitoring the new ACS.

Figure 7:
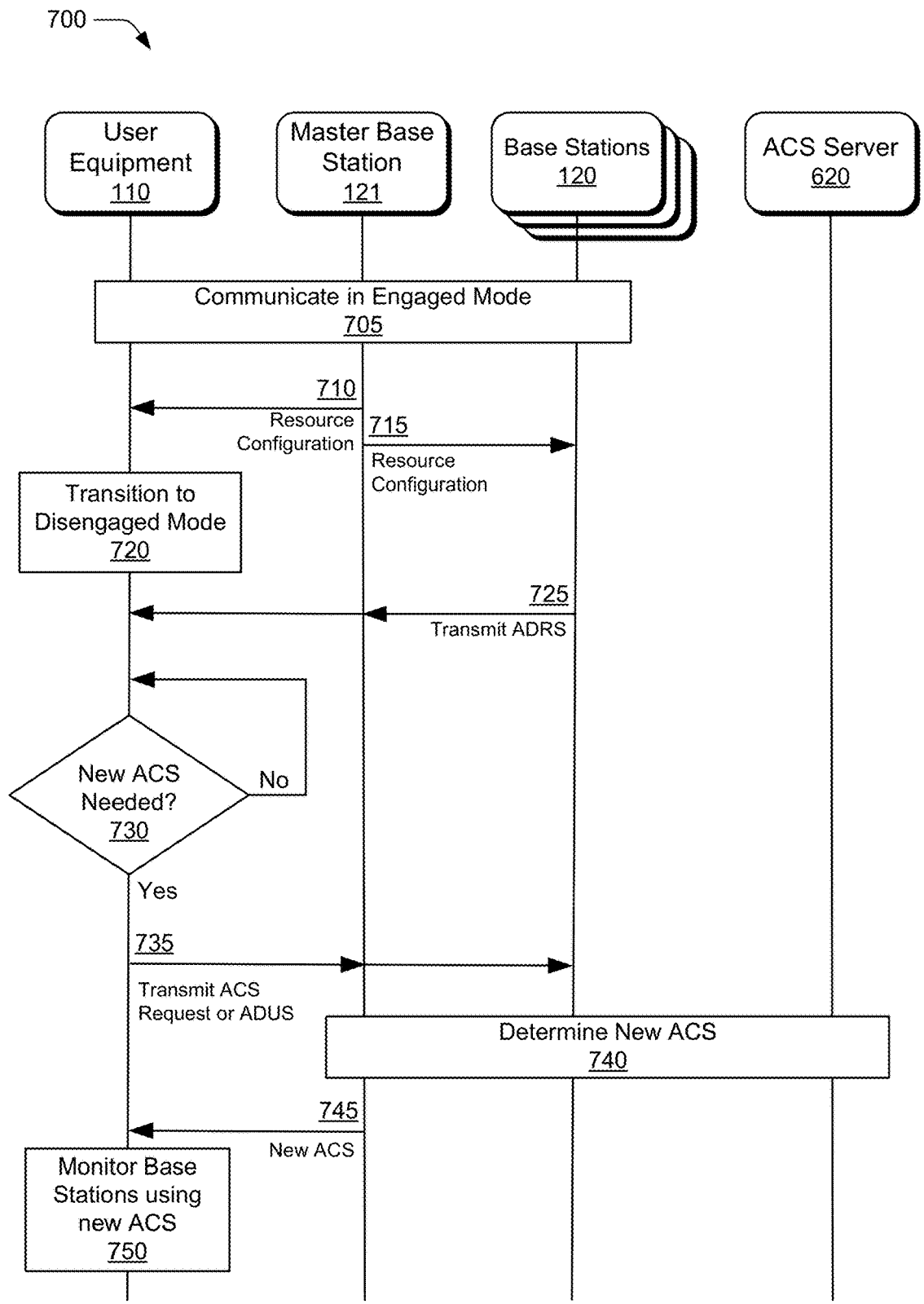
FIG. 7 illustrates an example of data and control transactions between devices in accordance with aspects of disengaged-mode active coordination set management techniques.

FIG. 7 illustrates an example of control transactions 700 among devices in accordance with aspects of disengaged-mode active coordination set management that generally relate to updating an ACS for a user equipment 110. At 705, the user equipment 110 is in the engaged mode 422 and is communicating with one or more of the base stations in an ACS, such as the master base station 121 and the base stations 120.

At 710, the master base station 121 transmits a resource configuration for the ADRS and the ADUS to the user equipment 110. Other base stations 120 may also jointly communicate the resource configuration (not shown in FIG. 7) along with the master base station 121. At 715, the master base station 121 sends the resource configuration to the base stations 120 in the ACS to configure the base stations 120 for communication of the ADRS and the ADUS.

At 720, the user equipment 110 transitions to the disengaged mode 424. This may occur when the UE experiences no engaged mode activity for a specified period of time or when the UE completes a communication session. At 725, the master base station 121 and the base stations 120 jointly and periodically transmit the ADRS.

At 730, the user equipment 110 periodically wakes up while in the disengaged mode, receives the ADRS, and evaluates if the ADRS has fallen below a threshold for link quality (e.g., a threshold value for a minimum RSRP level) that indicates a new ACS is needed. If the ADRS is above the threshold for link quality, the UE 110 continues to periodically monitor and evaluate the ADRS.

At 735, if the ADRS is below the threshold for link quality, the UE 110 either transmits an ACS request message to the master base station 121 requesting a new ACS or transmits the ADUS. As previously mentioned, the ACS request may be implemented as a mere ADUS or may include an ADUS plus additional parameters. In either case at 740, the transmission by the UE 110 causes the master base station 121 and/or the ACS Server 620 to determine a new ACS using any of the previously described techniques.

For example, the master base station 121 may determine base stations 120 to include in the new ACS if a sufficient number of ADUS signals were decoded. Alternatively, the master base station 121 may query the ACS Server 620 by design or configuration of the RAN 140 and the core network 150, or the master base station 121 may evaluate criteria to decide if it can create the new ACS or to query the ACS Server 620 for the new ACS.

For example, if the master base station 121 determines that received ADUS decode results are insufficient for it to choose base stations 120 for the new ACS, the master base station 121 instead sends a query to the ACS Server 620 that includes parameters such as an identification of the UE 110, the decode results from the base stations 120 that received the ADUS, the capabilities of the UE 110, or the like. The ACS Server 620 queries its database, based on the parameters in the query, and determines base stations 120 to include in the new ACS. In addition to the received query parameters, the ACS Server 620 can determine the base stations 120 to include in the new ACS based on one or more of: an estimation of a geographic location of the UE 110, one or more stored ACSs from other UEs 110 with similar ADUS decode results or geographic locations, previously created ACSs based on network architecture planning and service provider analysis and assessment, previous ACSs created as an output of Self-Organizing Network (SON) software and services, geographic locations of the base stations 120 in the RAN 140, configurations of the base stations 120 in the RAN 140, or the like.

In response to the query, the ACS Server 620 creates the new ACS for the UE 110. The analysis by the ACS Server 620 may populate the new ACS with base stations 120 on the same radio frequency as in the current ACS, on a different radio frequency than in the current ACS, or in a different new radio frequency band (e.g., in the below 1 GHz band instead of in the above 6 GHz band) than in the current ACS to improve communication reliability. The ACS Server 620 may include base stations 120 in the new ACS that cause the UE 110 to change one or more modes of operation, such as communicating in a different radio frequency band, changing a Modulation and Coding Scheme (MCS), changing a transmit power level, or the like.

At 745, the master base station 121 transmits the new ACS to the user equipment 110. Additionally (not shown in FIG. 7), the master base station 121 allocates resources for the new ACS and sends those resource allocations to the base stations 120 that are included in the new ACS. At 750, the user equipment monitors (e.g., periodically wakes up to receive) ADRSs from one or more base stations 120 in the new ACS while still in the disengaged mode 424.

Example Methods

Example methods 800 and 900 are described with reference to FIGS. 8 and 9 in accordance with one or more aspects of disengaged-mode active coordination set management. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 8:
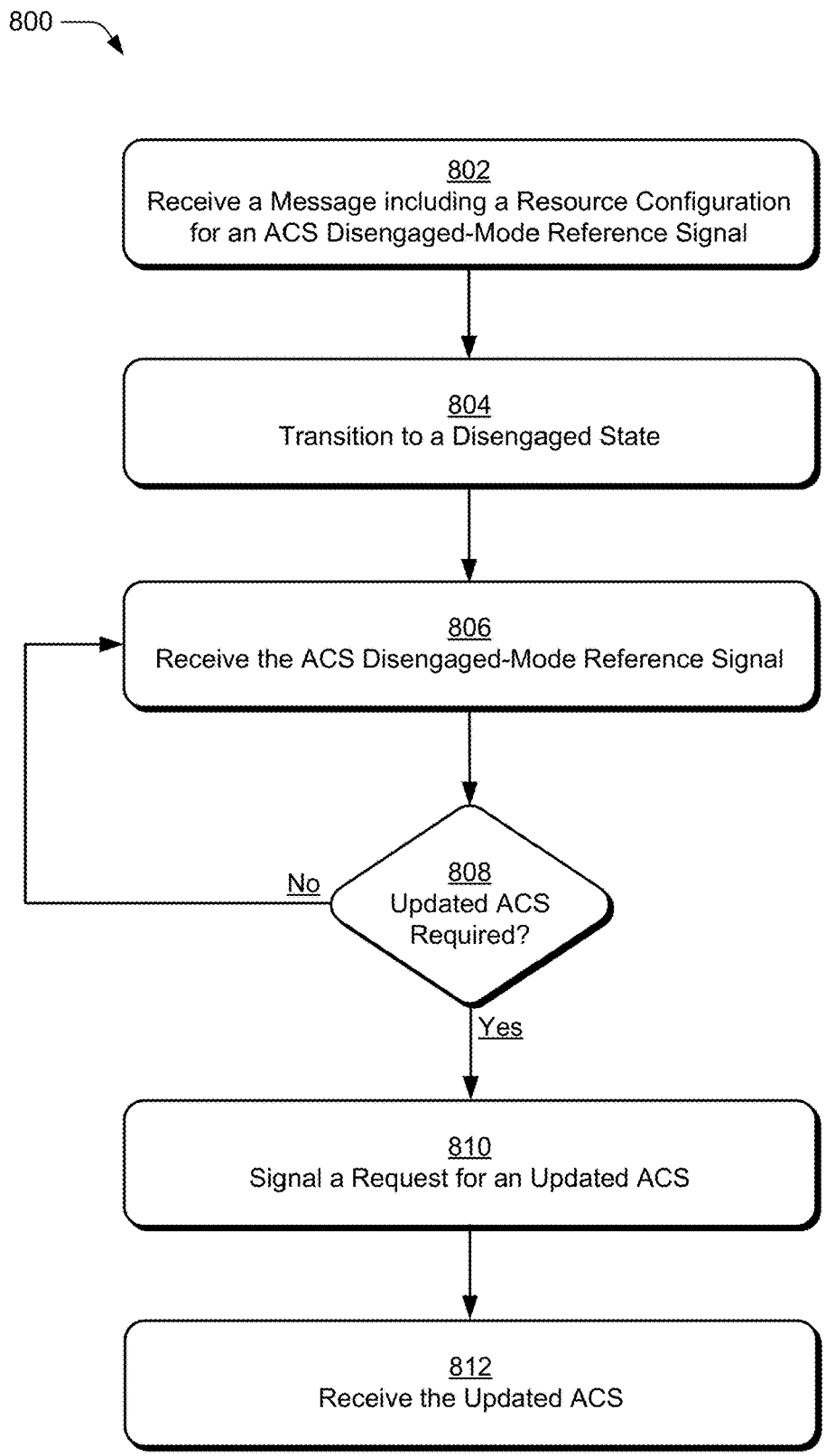
FIG. 8 illustrates an example method of disengaged-mode active coordination set management as generally related to the user equipment in accordance with aspects of the techniques described herein.

FIG. 8 illustrates example method(s) 800 of disengaged-mode active coordination set management as generally related to the user equipment 110. At block 802, a user equipment (e.g., the user equipment 110) receives a message including a resource configuration for an ACS Disengaged-mode Reference Signal (ADRS). For example, the user equipment receives the resource configuration that includes air interface resources allocated for the ADRS and the ADUS.

At block 804, the user equipment transitions to a disengaged mode 424. For example, the user equipment transitions from the engaged mode 422 to the disengaged mode 424. For example, when the UE experiences no connected mode 412 activity for a specified period of time, it transitions to the inactive mode 416. As another example, when the UE releases a session, it transitions from connected mode 412 to idle mode 414.

At block 806, the user equipment receives the ADRS using the resource configuration previously received at block 802. For example, while in the disengaged mode, the user equipment periodically wakes up and receives the ADRS.

At block 808, the user equipment determines if an updated ACS is required. For example, the user equipment evaluates a link quality parameter of the received ADRS and determines that a new ACS is required if the link quality parameter is below a threshold value. If the user equipment determines that a new ACS is not required, the user equipment continues to monitor the ADRS at block 806.

At block 810, based on determining that an updated ACS is required at block 808, the user equipment signals a request for an updated ACS. For example, the user equipment either transmits a request message to the master base station requesting a new ACS, which may include transmitting the ADUS. Alternatively, the mere transmission of an ADUS may indicate a request for a new ACS.

At block 812, the user equipment receives the updated ACS. For example, in response to user equipment's transmission, the master base station 121 determines the updated ACS and transmits the updated ACS, which the user equipment receives.

Figure 9:
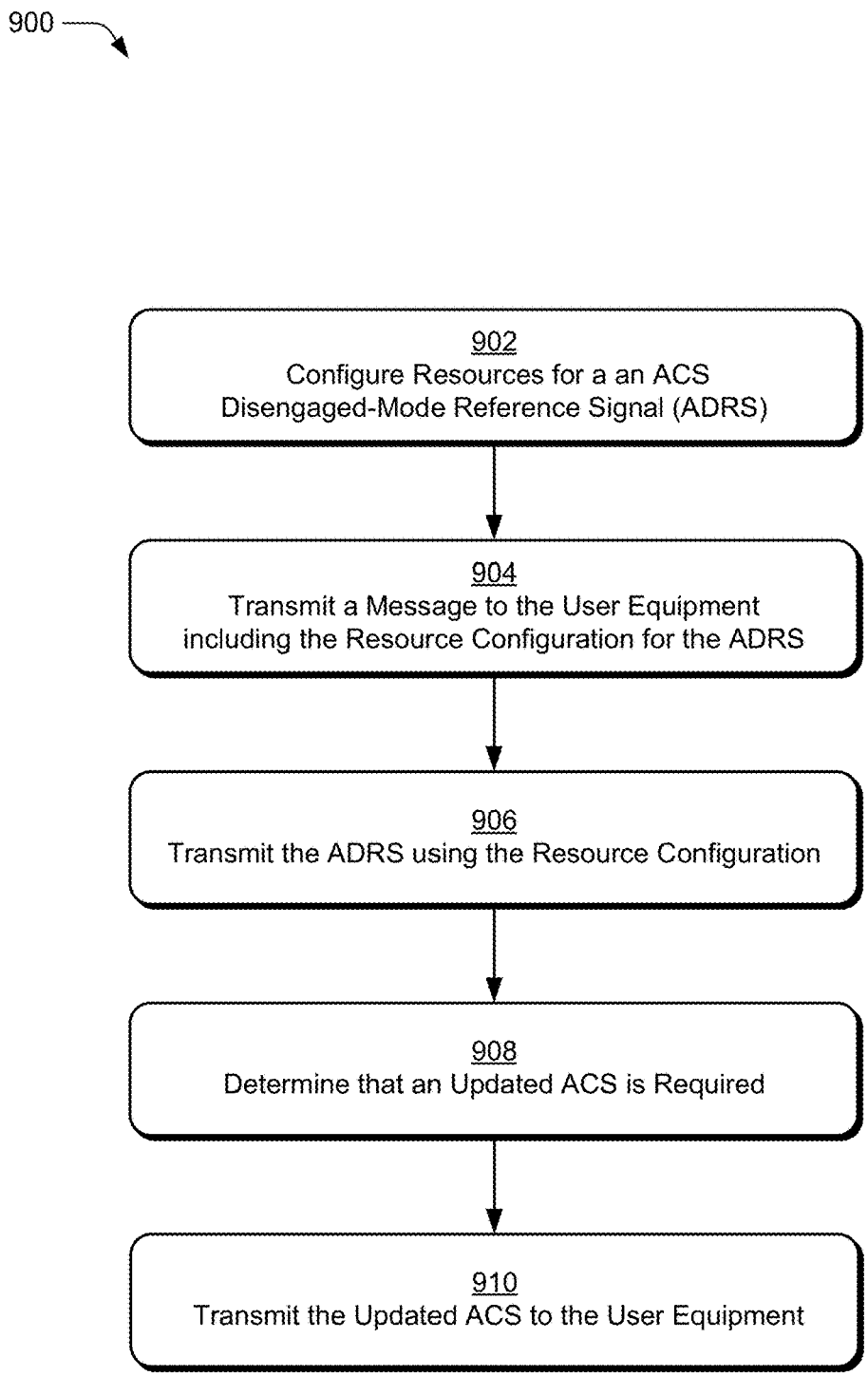
FIG. 9 illustrates an example method of disengaged-mode active coordination set management as generally related to the master base station in accordance with aspects of the techniques described herein.

FIG. 9 illustrates example method(s) 900 of disengaged-mode active coordination set management as generally related to the master base station 121. At block 902, the master base station (e.g., master base station 121) configures resources for a resource configuration for an ACS Disengaged-mode Reference Signal (ADRS).

At block 904, the master base station transmits a message to the user equipment including the resource configuration for the ADRS. For example, the master base station transmits a message to the user equipment including the configuration of air interface resources for the ADRS.

At block 906, the master base station transmits the ADRS using the resource configuration. For example, the master base station 121 and base stations 120 in the current ACS jointly and periodically transmit the ADRS. The master base station 121 and base stations 120 in the current ACS may transmit the ADRS in response to determining that the UE 110 is in the disengaged mode 424 or transmit the ADRS periodically regardless of the resource control state 410 of the UE 110.

At block 908, in response to transmitting the ADRS, the master base station determines that an updated ACS is required. For example, the master base station receives a message from the user equipment requesting the updated ACS or receives an ADUS from the user equipment. The master base station determines the base stations to include in the updated ACS. The updated ACS may be determined by the master base station 121 based on ADUS signals received at other base stations 120 which are processed and sent to the master base station 121, or may be determined by the ACS server 620 which sends the updated ACS to the master base station 121.

At block 910, the master base station transmits the updated ACS to the user equipment. For example, the master base station transmits a message to the user equipment including the new ACS.

A first method for maintaining an Active Coordination Set (ACS), by a user equipment (UE), for joint wireless communication between the user equipment and multiple base stations included in the ACS, comprises receiving, by the UE, a message including a resource configuration for an ACS Disengaged-mode Reference Signal (ADRS); transitioning to a disengaged mode; receiving, using the resource configuration, the ADRS; determining that an updated ACS is required; signaling a request for the updated ACS; and receiving the updated ACS.

In additional to the above described first method, in a second method the determining that the updated ACS is required comprises: measuring, by the UE, a link quality of the received ADRS; comparing the measured link quality to a threshold value for the link quality; and determining that the measured link quality is less than the threshold value.

In addition to the above described first method, in a third method the determining that the updated ACS is required comprises: measuring, by the UE, a location of the UE; comparing the measured location to a previous measured location; and determining that the UE has moved more than a threshold distance from the previous measured location.

In additional to any of the first, second, or third methods described above, the signaling comprises: transmitting, by the UE, a message to a master base station requesting the updated ACS.

In addition to any of the first, second, or third methods described above, the signaling comprises: transmitting, by the UE, an ACS Disengaged-mode Update Signal (ADUS) that is effective to cause base stations receiving the ADUS to measure an uplink quality parameter of the ADUS; and receiving the updated ACS, the updated ACS being based at least in part on the ADUS received by the base stations.

Although aspects of disengaged-mode active coordination set management have been described in language specific to features and/or methods, the subject of the appended claims is not necessarily limited to the specific features or methods described. Rather, the specific features and methods are disclosed as example implementations of disengaged-mode active coordination set management, and other equivalent features and methods are intended to be within the scope of the appended claims. Further, various different aspects are described, and it is to be appreciated that each described aspect can be implemented independently or in connection with one or more other described aspects.

What is claimed is:

1. A method for maintaining an Active Coordination Set (ACS), by a user equipment (UE), for joint wireless communication between the user equipment and multiple base stations included in the ACS, the method comprising:
    receiving, by the UE, a message including a resource configuration for an ACS Disengaged-mode Reference Signal (ADRS) and an ACS Disengaged-mode Update Signal (ADUS);
    transitioning to a disengaged mode;
    receiving, by the UE and using the received ADRS resource configuration and while in the disengaged mode, the ADRS;
    determining, by the UE, that an updated ACS is required based on the received ADRS;
    based on determining that the updated ACS is required, signaling a request for the updated ACS by the UE transmitting, using the received ADUS resource configuration, the ADUS that directs base stations receiving the ADUS to measure an uplink quality parameter of the ADUS; and
    receiving the updated ACS, the updated ACS being based at least in part on the ADUS received by the base stations.

2. The method of claim 1, wherein the determining that the updated ACS is required comprises:
    measuring, by the UE, a link quality of the received ADRS;
    comparing the measured link quality to a threshold value for the link quality; and
    determining that the measured link quality is less than the threshold value.

3. The method of claim 1, wherein the signaling comprises:
    transmitting, by the UE, a message to a master base station requesting the updated ACS.

4. The method of claim 1, wherein the determining that the updated ACS is required comprises:
    measuring, by the UE, a location of the UE;
    comparing the measured location to a previous measured location; and
    determining that the UE has moved more than a threshold distance from the previous measured location.

5. The method of claim 4, further comprising:
    based on determining that the UE has moved more than the threshold distance, transmitting, by the UE, an ADUS that is effective to cause base stations receiving the ADUS to measure an uplink quality parameter of the ADUS; and
    receiving the updated ACS, the updated ACS being based at least in part on the ADUS received by the base stations.

6. The method of claim 1, further comprising:
    transitioning, by the UE, to an engaged mode; and
    jointly communicating with one or more of the base stations included in the updated ACS.

7. The method of claim 6, wherein the engaged mode is a connected mode.

8. The method of claim 1, wherein the disengaged mode is an idle mode or an inactive mode.

9. The method of claim 1, further comprising:
  receiving, by the UE, another resource configuration for the ADRS, the other resource configuration indicating that the ADRS is transmitted on a new radio frequency (RF) channel; and
  receiving the ADRS on the new RF channel.

10. The method of claim 1, wherein the receiving the ADRS comprises:
  receiving the ADRS when the UE, in the disengaged mode, wakes up to monitor for paging messages.

11. A method by a master base station for managing an Active Coordination Set (ACS) for joint wireless communication with a user equipment (UE), the method comprising:
  configuring, by the master base station, air interface resources for transmitting an ACS Disengaged-mode Reference Signal (ADRS) and air interface resources for receiving an ACS Disengaged-mode Update Signal (ADUS) from the UE;
  transmitting a message to the UE including the resource configuration;
  jointly-transmitting, by the master base station with one or more other base stations in the ACS, the ADRS using the configured air interface resources;
  receiving the ADUS that requests an updated ACS; and
  in response to receiving the ADUS, transmitting the updated ACS.

12. The method of claim 11, further comprising:
  receiving, by the master base station, a message from the UE requesting the updated ACS.

13. The method of claim 12, further comprising:
  receiving, at the master base station, a forwarded request message from another base station in a current ACS.

14. The method of claim 11, wherein the transmitting the updated ACS comprises:
  selecting a set of base stations to include in the updated ACS; and
  including the selected set of base stations in the updated ACS.

15. The method of claim 14, wherein the selecting the set of base stations to include in the ACS comprises analyzing at least one of:
  a downlink quality parameter for the ADRS measured by the UE;
  a current location of the UE;
  an ACS from another UE;
  an uplink quality parameter from the ADUS; or
  a previously stored ACS associated with the UE.

16. The method of claim 11, wherein the receiving the ADUS that requests an updated ACS comprises:
  receiving, by the master base station, the ACS Disengaged-mode Update Signal (ADUS) from the UE using the air interface resources configured for the ADUS.

17. The method of claim 16, wherein the ADUS is received using the resource configuration for the ADRS.

18. The method of claim 16, wherein the receiving the ADUS that requests an updated ACS comprises:
  receiving, by the master base station, a forwarded uplink quality parameter from another base station in a current ACS that received the ADUS.

19. The method of claim 18, wherein the transmitting the updated ACS comprises:
  measuring, by the master base station, the uplink quality parameter of the ADUS received by the master base station;
  analyzing the uplink quality parameter of the ADUS measured by the master base station and the uplink quality parameters forwarded by additional base stations; and
  based on the analyzing, selecting a set of base stations to include in the updated ACS.

20. The method of claim 11, wherein the transmitting the updated ACS comprises:
  sending, by the master base station, a query to an ACS Server that causes the ACS server to select a set of base stations to include in the updated ACS; and
  receiving the set of base stations to include in the updated ACS from the ACS server.

21. The method of claim 20, wherein the query includes one or more of:
  an uplink quality parameter of an ACS Disengaged-mode Update Signal (ADUS) received by the master base station;
  uplink quality parameters forwarded by additional base stations in the ACS that received the ADUS;
  an identifier of the UE;
  a downlink quality parameter for the ADRS measured by the UE; or
  a current location of the UE.

22. The method of claim 20, wherein the ACS Server includes a database comprising one or more of: a previous ACS for the UE, ACSs for other UEs, ACSs created based on network planning, ACSs created based on an output of Self-Organizing Network (SON) software and services, historical information for the UE, or a path frequently traveled by the UE, and wherein the ACS Server selects the set of base stations based on querying the database using contents of the received query.

* * * * *